(12) United States Patent
Lee et al.

(10) Patent No.: US 7,255,147 B2
(45) Date of Patent: Aug. 14, 2007

(54) BONDING DEVICE FOR FABRICATING LIQUID CRYSTAL DISPLAY AND SUBSTRATE FOR FABRICATING LIQUID CRYSTAL DISPLAY

(75) Inventors: Sang Seok Lee, Taegu-kwangyokshi (KR); Sang Ho Park, Posan-kwanyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 221 days.

(21) Appl. No.: 10/259,321

(22) Filed: Sep. 30, 2002

(65) Prior Publication Data

US 2003/0173032 A1    Sep. 18, 2003

(30) Foreign Application Priority Data

Mar. 16, 2002    (KR) .......................... 10-2002-14280

(51) Int. Cl.
*B32B 37/10* (2006.01)
(52) U.S. Cl. ...................... 156/382; 349/187; 349/191; 349/192; 313/512
(58) Field of Classification Search ................ 156/381, 156/358, 367, 378, 382; 349/1, 158, 153, 349/187, 189, 191, 192
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. ................. 359/76 |
| 5,263,888 A | 11/1993 | Ishihara et al. | |
| 5,379,139 A | 1/1995 | Sato et al. | |
| 5,406,989 A | 4/1995 | Abe | |
| 5,407,519 A * | 4/1995 | Joffe et al. ................... 156/358 |
| 5,499,128 A | 3/1996 | Hasegawa et al. | |
| 5,507,323 A | 4/1996 | Abe | |
| 5,511,591 A | 4/1996 | Abe ............................... 141/7 |
| 5,539,545 A | 7/1996 | Shimizu et al. | |
| 5,548,429 A | 8/1996 | Tsujita | |
| 5,642,214 A | 6/1997 | Ishii et al. ..................... 349/96 |
| 5,680,189 A | 10/1997 | Shimizu et al. | |
| 5,682,228 A * | 10/1997 | Miyake ......................... 355/75 |
| 5,742,370 A | 4/1998 | Kim et al. .................. 349/124 |

(Continued)

FOREIGN PATENT DOCUMENTS

EP    1003066    5/2000

(Continued)

*Primary Examiner*—Jeff H. Aftergut
*Assistant Examiner*—Daniel McNally
(74) *Attorney, Agent, or Firm*—McKenna Long & Aldridge LLP

(57) ABSTRACT

A bonding device for fabricating a liquid crystal display includes a vacuum chamber, an upper stage and a lower stage within the vacuum chamber, a stage moving system moving at least one of the upper and lower stages, a plurality of first observation holes formed through regions of the upper stage, a plurality of second observation holes formed through an upper portion of the vacuum chamber, each aligned to one of the plurality of first observation holes, and a plurality of alignment cameras, each camera aligned with the each of the first and second observation holes.

12 Claims, 9 Drawing Sheets

U.S. PATENT DOCUMENTS

| | | | |
|---|---|---|---|
| 5,757,451 A | 5/1998 | Miyazaki et al. | |
| 5,771,085 A * | 6/1998 | Ochi et al. | 349/158 |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,936,695 A * | 8/1999 | Hida et al. | 349/153 |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | 349/190 |
| 6,011,629 A * | 1/2000 | Ootake et al. | 356/400 |
| 6,016,178 A | 1/2000 | Kataoka et al. | 349/117 |
| 6,016,181 A | 1/2000 | Shimada | |
| 6,023,313 A * | 2/2000 | Hazama | 349/95 |
| 6,036,568 A * | 3/2000 | Murouchi et al. | 445/25 |
| 6,043,667 A * | 3/2000 | Cadwallader et al. | 324/758 |
| 6,055,035 A | 4/2000 | Von Gutfeld et al. | 349/187 |
| 6,163,357 A | 12/2000 | Nakamura | 349/155 |
| 6,193,576 B1 * | 2/2001 | Gaynes et al. | 445/24 |
| 6,219,126 B1 | 4/2001 | Von Gutfeld | |
| 6,226,067 B1 | 5/2001 | Nishiguchi et al. | 349/155 |
| 6,236,445 B1 | 5/2001 | Foschaar et al. | |
| 6,304,306 B1 | 10/2001 | Shiomi et al. | 349/88 |
| 6,304,311 B1 | 10/2001 | Egami et al. | |
| 6,337,730 B1 | 1/2002 | Ozaki et al. | |
| 6,414,733 B1 | 7/2002 | Ishikawa et al. | 349/110 |
| 6,646,689 B2 * | 11/2003 | Matsuda | 349/1 |
| 6,856,029 B1 * | 2/2005 | Daniel et al. | 257/797 |
| 2001/0021000 A1 | 9/2001 | Egami et al. | |
| 2002/0008838 A1 | 1/2002 | Matsuda | |

FOREIGN PATENT DOCUMENTS

| | | |
|---|---|---|
| JP | 51-65656 | 6/1976 |
| JP | 52-149725 | 12/1977 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-54225 | 3/1987 |
| JP | 62-54228 | 3/1987 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 3-009549 | 1/1991 |
| JP | 05-036425 | 2/1993 |
| JP | 05-107533 | 4/1993 |
| JP | 5-127179 | 5/1993 |
| JP | 5-154923 | 6/1993 |
| JP | 05-264943 | 10/1993 |
| JP | 5-265011 | 10/1993 |
| JP | 5-281557 | 10/1993 |
| JP | 5-281562 | 10/1993 |
| JP | 06-018829 | 1/1994 |
| JP | 6-51256 | 2/1994 |
| JP | 6-148657 | 5/1994 |
| JP | 6-160871 | 6/1994 |
| JP | 06-194637 | 7/1994 |
| JP | 6-235925 | 8/1994 |
| JP | 6-313870 | 8/1994 |
| JP | 6-265915 | 9/1994 |
| JP | 7-84268 | 3/1995 |
| JP | 07-084268 | 3/1995 |
| JP | 7-128674 | 5/1995 |
| JP | 7-181507 | 7/1995 |
| JP | 07-275770 | 10/1995 |
| JP | 07-275771 | 10/1995 |
| JP | 8-95066 | 4/1996 |
| JP | 8-101395 | 4/1996 |
| JP | 8-106101 | 4/1996 |
| JP | 08-136937 | 5/1996 |
| JP | 8-171094 | 7/1996 |
| JP | 8-190099 | 7/1996 |
| JP | 8-240807 | 9/1996 |
| JP | 09-001026 | 1/1997 |
| JP | 9-5762 | 1/1997 |
| JP | 09-022018 | 1/1997 |
| JP | 9-26578 | 1/1997 |
| JP | 9-61829 | 3/1997 |
| JP | 09-61829 | 3/1997 |
| JP | 9-73075 | 3/1997 |
| JP | 9-73096 | 3/1997 |
| JP | 09-94500 | 4/1997 |
| JP | 9-127528 | 5/1997 |
| JP | 9-230357 | 9/1997 |
| JP | 9-281511 | 10/1997 |
| JP | 9-311340 | 12/1997 |
| JP | 09-329775 | 12/1997 |
| JP | 10-123537 | 5/1998 |
| JP | 10-123538 | 5/1998 |
| JP | 10-142616 | 5/1998 |
| JP | 10-174924 | 6/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-133438 | 12/1998 |
| JP | 11-14953 | 1/1999 |
| JP | 11-38424 | 2/1999 |
| JP | 11-64811 | 3/1999 |
| JP | 11065667 A * | 3/1999 |
| JP | 11-109388 | 4/1999 |
| JP | 11-142864 | 5/1999 |
| JP | 11-174477 | 7/1999 |
| JP | 11-212045 | 8/1999 |
| JP | 11-248930 | 9/1999 |
| JP | 11-262712 | 9/1999 |
| JP | 11-264991 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-66218 | 3/2000 |
| JP | 2000-93866 | 4/2000 |
| JP | 2000-137235 | 5/2000 |
| JP | 2000-147528 | 5/2000 |
| JP | 2000-193988 | 7/2000 |
| JP | 2000-241824 | 8/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |

| | | | | | |
|---|---|---|---|---|---|
| JP | 2001-91727 | 4/2001 | JP | 2002-122870 | 4/2002 |
| JP | 2001-117105 | 4/2001 | JP | 2002-122872 | 4/2002 |
| JP | 2001-117109 | 4/2001 | JP | 2002-122873 | 4/2002 |
| JP | 2001-133745 | 5/2001 | JP | 2002-131762 | 5/2002 |
| JP | 2001-133794 | 5/2001 | JP | 2002-139734 | 5/2002 |
| JP | 2001-133799 | 5/2001 | JP | 2002-156518 | 5/2002 |
| JP | 2001-142074 | 5/2001 | JP | 2002-169166 | 6/2002 |
| JP | 2001-147437 | 5/2001 | JP | 2002-169167 | 6/2002 |
| JP | 2001-154211 | 6/2001 | JP | 2002-182222 | 6/2002 |
| JP | 2001-166272 | 6/2001 | JP | 2002-202512 | 7/2002 |
| JP | 2001-166310 | 6/2001 | JP | 2002-202514 | 7/2002 |
| JP | 2001-183683 | 7/2001 | JP | 2002-214626 | 7/2002 |
| JP | 2001-201750 | 7/2001 | JP | 2002-229042 | 8/2002 |
| JP | 2001-209052 | 8/2001 | JP | 2002-236276 | 8/2002 |
| JP | 2001-209056 | 8/2001 | JP | 2002-236292 | 8/2002 |
| JP | 2001-209057 | 8/2001 | JP | 2002-258299 | 9/2002 |
| JP | 2001-209058 | 8/2001 | JP | 2002-277865 | 9/2002 |
| JP | 2001-209060 | 8/2001 | JP | 2002-277866 | 9/2002 |
| JP | 2001-215459 | 8/2001 | JP | 2002-277881 | 9/2002 |
| JP | 2001-222017 | 8/2001 | JP | 2002-287156 | 10/2002 |
| JP | 2001-235758 | 8/2001 | JP | 2002-296605 | 10/2002 |
| JP | 2001-255542 | 9/2001 | JP | 2002-311438 | 10/2002 |
| JP | 2001-264782 | 9/2001 | JP | 2002-311440 | 10/2002 |
| JP | 2001-272640 | 10/2001 | JP | 2002-311442 | 10/2002 |
| JP | 2001-281675 | 10/2001 | JP | 2002-323687 | 11/2002 |
| JP | 2001-281678 | 10/2001 | JP | 2002-323694 | 11/2002 |
| JP | 2001-282126 | 10/2001 | JP | 2002-333628 | 11/2002 |
| JP | 2001-305563 | 10/2001 | JP | 2002-333635 | 11/2002 |
| JP | 2001-330837 | 11/2001 | JP | 2002-333843 | 11/2002 |
| JP | 2001-330840 | 11/2001 | JP | 2002-341329 | 11/2002 |
| JP | 2001-356353 | 12/2001 | JP | 2002-341355 | 11/2002 |
| JP | 2001-356354 | 12/2001 | JP | 2002-341356 | 11/2002 |
| JP | 2002-14360 | 1/2002 | JP | 2002-341357 | 11/2002 |
| JP | 2002-23176 | 1/2002 | JP | 2002-341358 | 11/2002 |
| JP | 2002-49045 | 2/2002 | JP | 2002-341359 | 11/2002 |
| JP | 2002-79160 | 3/2002 | JP | 2002-341362 | 11/2002 |
| JP | 2002-080321 | 3/2002 | KP | 10-2002-15004 | 7/2001 |
| JP | 2002-82340 | 3/2002 | KR | 2000-35302 | 6/2000 |
| JP | 2002-90759 | 3/2002 | | | |
| JP | 2002-90760 | 3/2002 | | | |
| JP | 2002-107740 | 4/2002 | | | |

* cited by examiner

/ BONDING DEVICE FOR FABRICATING
LIQUID CRYSTAL DISPLAY AND
SUBSTRATE FOR FABRICATING LIQUID
CRYSTAL DISPLAY

The present invention claims the benefit of the Korean Patent Application No. P2002-014280 filed in Korea on Mar. 16, 2002, which is hereby incorporated by reference.

BACKGROUND OF THE INVENTION

1. Field of the Invention

The present invention relates to a bonding device, and more particularly, to a bonding device for fabricating a liquid crystal display device and a substrate for fabricating a liquid crystal display.

2. Discussion of the Related Art

In general, various flat panel type displays, such as liquid crystal display (LCD), plasma display panel (PDP), electroluminescent display (ELD), and vacuum fluorescent display (VFD), have been developed to replace conventional cathode ray tube (CRT) devices. More particularly, LCD devices have been commonly used for their high resolution, light weight, thin profile, and low power consumption. In addition, LCD devices have been implemented in mobile devices, such as display monitors for notebook computers, and have been developed for computer displays and television monitors in order to receive and display broadcasting signals.

Various processes are commonly used for fabricating an LCD device. One process for fabricating an LCD device according to the related art involves a liquid crystal injection method that includes steps of forming a sealant pattern on one of a first and second substrate to form an injection inlet, bonding the first and second substrates to each other within a vacuum processing chamber, and injecting liquid crystal display material through the injection inlet. A second process for fabricating an LCD device according to the related art includes a liquid crystal dropping method which is advantageous over the liquid crystal injection method. liquid crystal dropping method. The liquid crystal dropping method is disclosed in Japanese Patent Application Nos. 11-089612 and 11-172903, and includes dropping liquid crystal material on a first substrate, arranging a second substrate over the first substrate, and moving the first substrate close to the second substrate within a vacuum state, thereby bonding the first and second substrates to each other. In the liquid crystal dropping method, steps of forming a liquid crystal material injection inlet, injecting the liquid crystal material, and sealing the injection inlet, are unnecessary since the liquid crystal material is predisposed on the first substrate.

FIG. 1 is a cross sectional view of a substrate bonding device according to the related art during a loading process. In FIG. 1, the substrate bonding device includes a frame 10, an upper stage 21, a lower stage 22, a sealant dispenser (not shown), a liquid crystal material dispenser 30, a processing chamber including upper and lower processing units 31 and 32, a chamber moving system 40, a stage moving system 50, an alignment system 70, and a vacuum pump 60. The sealant dispenser (not shown) and the liquid crystal material dispenser 30 are mounted on a side of the frame 10, whereby the bonding process of the frame is carried out.

The chamber moving system 40 includes a driving motor driven to selectively move the lower processing chamber 32 to a location where the bonding process is carried out, or to a location at which outflow of the sealant occurs. The stage moving system 50 includes a driving motor driven to selectively move the upper stage 21 along a vertical direction. The vacuum pump 60 is connected to a duct that is connected to an interior of the upper processing unit 31. Accordingly, when the upper and lower processing units 31 and 32 are connected, the vacuum pump 60 can reduce a pressure in the interior of the processing chamber.

The alignment system 70 includes an alignment camera for verifying an alignment state between a second substrate 52 attached to the upper stage 21 and a first substrate 51 attached to the lower stage 22, and is fixed to an upper surface of the upper processing unit 31. In addition, the alignment system 70 includes a transparent glass 31a installed within the upper processing unit 31 to allow the alignment camera to verify the alignment state between the first and second substrates 51 and 52.

FIG. 2 is a cross sectional view of the substrate bonding device according to the related art during the bonding process. In FIG. 2, the second substrate 52 is loaded onto the upper stage 21, and the first substrate 51 is loaded onto the lower stage 22. Then, the lower processing unit 32, having the lower stage 22, is moved into a processing location by the chamber moving system 40 for sealant dispensing and liquid crystal material dispensing. Subsequently, the lower processing unit 32 is moved into a processing location for substrate bonding by the chamber moving system 40. Thereafter, the upper and lower processing units 31 and 32 are assembled together by the chamber moving system 40 to form a vacuum tight seal, and the vacuum pump 60 is driven to maintain a vacuum state within the space defined between the upper and lower processing units 31 and 32.

The upper stage 21 moves downwards to reach a location whereby a position alignment between each of the first and second substrates 51 and 52 is to be carried out. Then, the alignment system camera 70 verifies alignment marks on the first substrate 51 loaded onto the lower stage 22 and the second substrate 52 loaded onto the upper stage 21. The alignment system camera views the alignment marks through the transparent glass 31a formed on the upper processing unit 31 and an opening 21a formed on the upper stage 21. After reading data corresponding to the alignment marks transmitted by the alignment camera 70, a position alignment process of the first and second substrates 51 and 52 is performed.

During the position alignment process, any misalignment amount between the first and second substrates 51 and 52 is verified by the alignment system camera 70, and is converted into a tilt amount. The stage moving system 40 is controlled according to this converted tilt amount, thereby compensating for the misalignment amount between the first and second substrates 51 and 52.

Once the position alignment process is complete, the stage moving system 50 moves the upper stage 21 to a lower location, thus closely contacting the substrate 52 loaded to the upper stage 21 with the substrate 51 loaded to the lower stage 22. Then, pressure is continuously applied to the first and second substrates 51 and 52, thereby performing a bonding process of the first and second substrates 51 and 52 and completing the fabricating process of the liquid crystal display.

However, the above-described bonding device according to the related art has the following disadvantages. With the advent of large-sized liquid crystal displays, the current bonding devices include a plurality of liquid crystal displays, each fabricated by bonding a pair of substrates. Thus, the position alignment between each substrate has become increasingly more critical. More specifically, when two misaligned substrates are bonded together, each cell area formed on each substrate cannot be accurately bonded to its corresponding cell area. Accordingly, the alignment of each cell area is highly dependent upon an overall alignment of the substrates.

In addition, as the number of cell areas formed on each substrate increases, the position alignment between each substrate should be carried out with more accuracy. However, in the bonding device according to the related art, alignment marks are formed only on two diagonal corner regions of each substrate, therefore an accurate position alignment cannot be carried out in regions without an alignment mark. Accordingly, as the size of a substrate becomes larger, the process of bonding two substrates becomes increasingly more critical.

Finally, since accurate alignment only occurs on the diagonal regions on each substrate, misalignment may occur in the remaining cell areas on the substrates, thereby causing a minor error difference. However, in the bonding device according to the related art such error differences are not compensated. Moreover, the bonding device according to the related art is problematic when carrying out a mass production of liquid crystal displays by bonding large-sized substrates having a plurality of cell areas.

SUMMARY OF THE INVENTION

Accordingly, the present invention is directed to a bonding device for fabricating a liquid crystal display and a substrate for fabricating a liquid crystal display that substantially obviates one or more problems due to limitations and disadvantages of the related art.

An object of the present invention is to provide a bonding device for fabricating a liquid crystal display device that allows accurate positioning alignment of each substrate prior to bonding.

Another object of the present invention is to provide a substrate for fabricating a liquid crystal display to increase the accuracy of position alignment between each substrate.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, a bonding device for fabricating a liquid crystal display includes a vacuum chamber, an upper stage and a lower stage within the vacuum chamber, a stage moving system moving at least one of the upper and lower stages, a plurality of first observation holes formed through regions of the upper stage, a plurality of second observation holes formed through an upper portion of the vacuum chamber, each aligned to one of the plurality of first observation holes, and a plurality of alignment cameras, each camera aligned with the each of the first and second observation holes.

In another aspect, a substrate for fabricating a liquid crystal display includes a plurality of cell areas and dummy areas, and an alignment mark formed on dummy areas adjacent to the cell areas.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
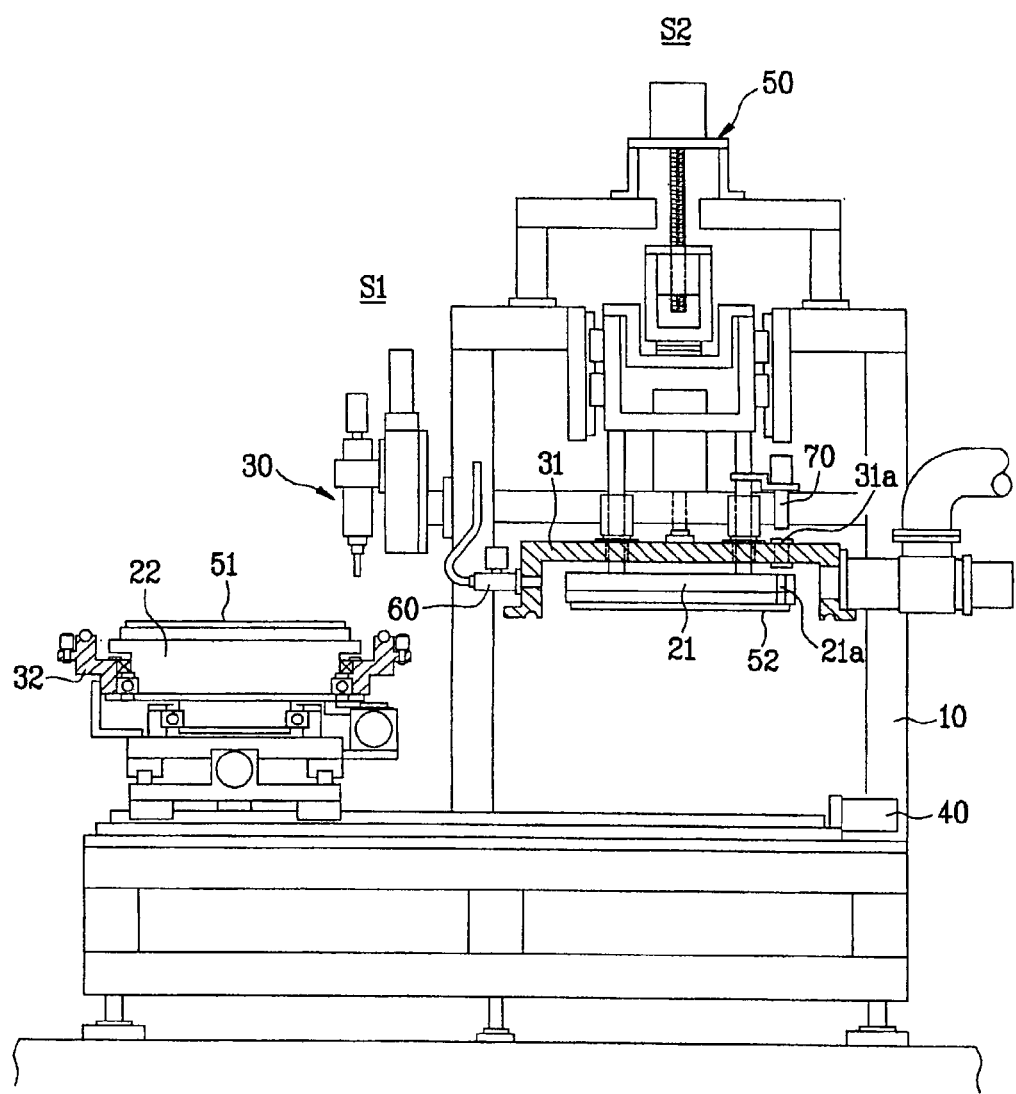
FIG. 1 is a cross sectional view of a substrate bonding device according to the related art during a loading process.
Figure 2:
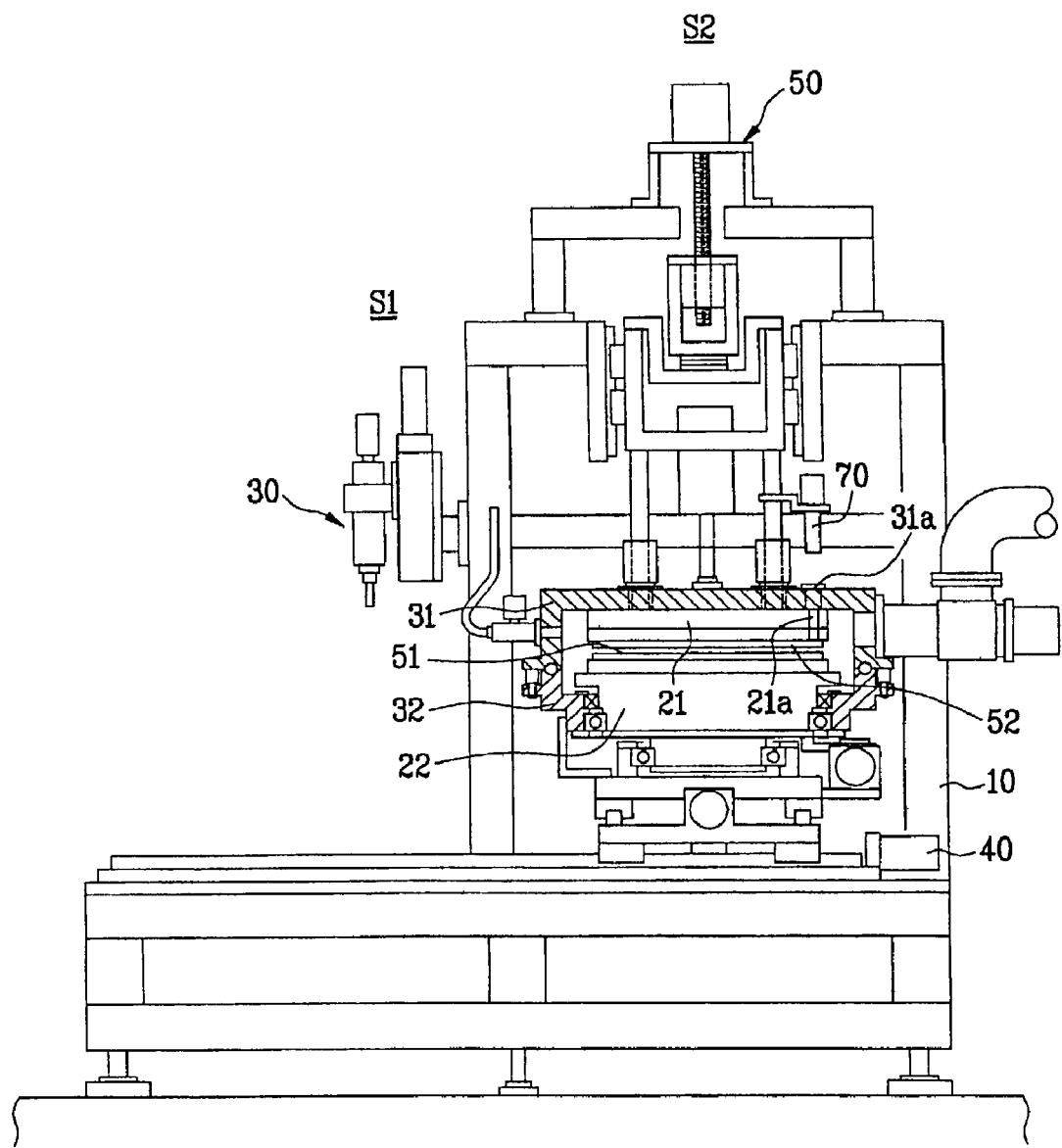
FIG. 2 is a cross sectional view of the substrate bonding device according to the related art during the bonding process.
Figure 3A:
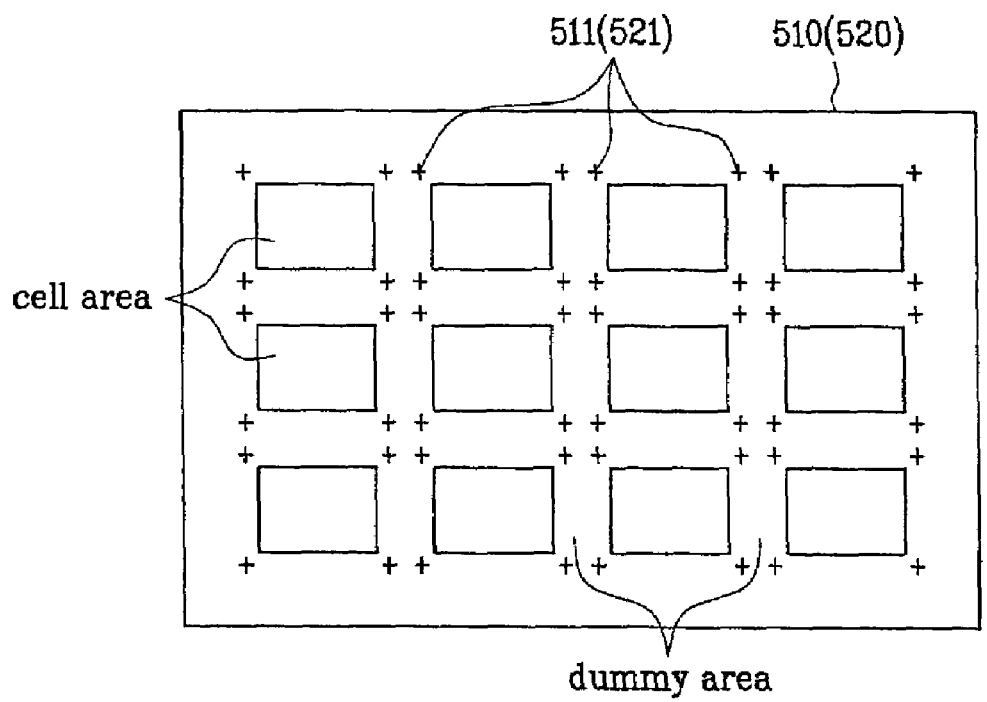
FIG. 3A is a plane view of an exemplary substrate for fabricating a liquid crystal display according to the present invention.

FIG. 3A is a plane view of an exemplary substrate for fabricating a liquid crystal display according to the present invention. In FIG. 3A, each of the upper and lower substrates 510 and 520 may include a plurality of cell areas and dummy areas. Each of the dummy areas may be adjacent to each of the cell areas and may include first and second alignment marks 511 and 521.

The first and second alignment marks 511 and 521 may be formed within a corner region of each cell area adjacent to each dummy area. Although each of the first and second alignment marks 511 and 521 are shown in FIG. 3A to be of a "cross-hair" configuration, each of the first and second alignment marks 511 and 521 may include other indicia for verifying alignment. For example, a plurality of parallel lines may be used as the first and second alignment marks 511 and 521 such that a constructive interference is generated when viewed by an alignment camera. In addition, each of the first and second alignment marks 511 and 521 may be different such that a combination, or combinations of different indicia may be incorporated. For example, a combination of "cross-hair" alignment marks may be used along an outer perimeter of each of the substrates and parallel line indicia may be used within regions between adjacent cell areas inside the outer perimeter of each of the substrates.

Moreover, although rectangular cell areas are shown in FIG. 3A, other geometries may be considered. For example, square and circular cell areas may be considered such that alignment marks are positioned adjacent to the square and circular cell areas.

Figure 3B:
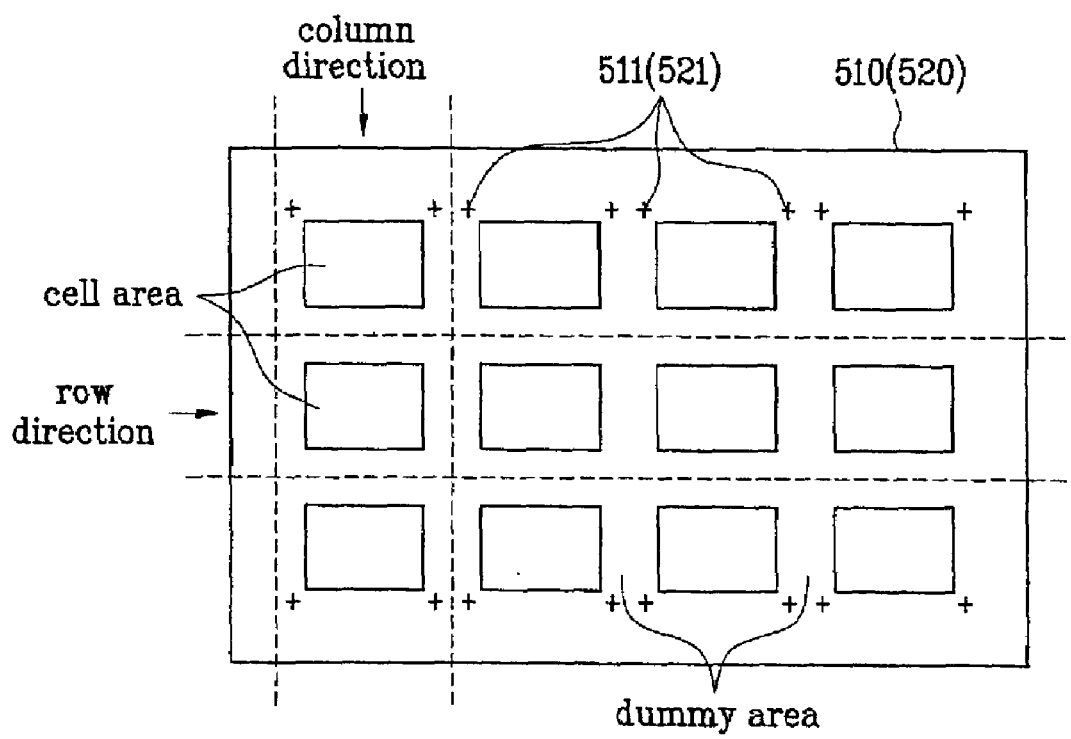
FIG. 3B is a plane view of another exemplary substrate for fabricating a liquid crystal display according to the present invention.

FIG. 3B is a plane view of another exemplary substrate for fabricating a liquid crystal display according to the present invention. In FIG. 3B, the alignment mark 511 and 521 may be formed in at least two corner regions of each dummy area on each column formed by the cell area. Accordingly, the alignment marks 511 and 521 are formed only along the outer perimeter of the first and second substrates 510 and 520. Alternatively, a combination of alignment marks 511 and 521 may be formed only at the outer corner regions of the first and second substrates 510 and 520. Moreover, a combination of alignment marks 511 and 521 may be formed along the outer perimeter only at regions other than the outer corner regions of the first and second substrates 510 and 520.

Figure 3C:
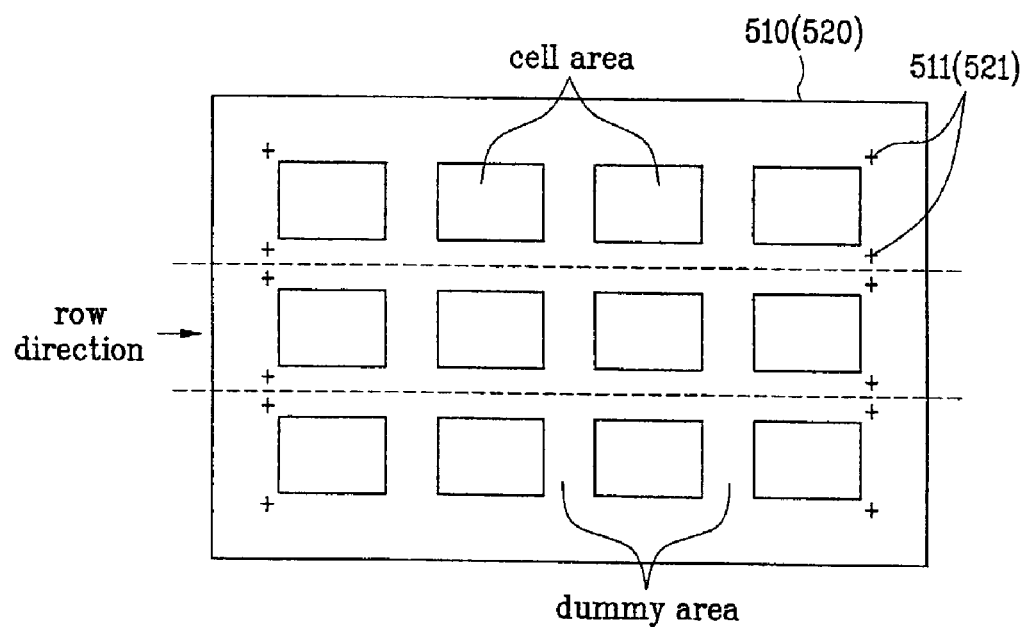
FIG. 3C is a plane view of another exemplary substrate for fabricating a liquid crystal display according to the present invention.

FIG. 3C is a plane view of another exemplary substrate for fabricating a liquid crystal display according to the present invention. In FIG. 3C, the alignment mark 511 and 521 may be formed in at least two corner regions of each dummy area on each row formed by the cell areas. Accordingly, the alignment marks 511 and 521 are formed only along the outer perimeter of the first and second substrates 510 and 520. Alternatively, a combination of alignment marks 511 and 521 may be formed only at the outer corner regions of the first and second substrates 510 and 520. Moreover, a combination of alignment marks 511 and 521 may be formed along the outer perimeter only at regions other than the outer corner regions of the first and second substrates 510 and 520.

Figure 3D:
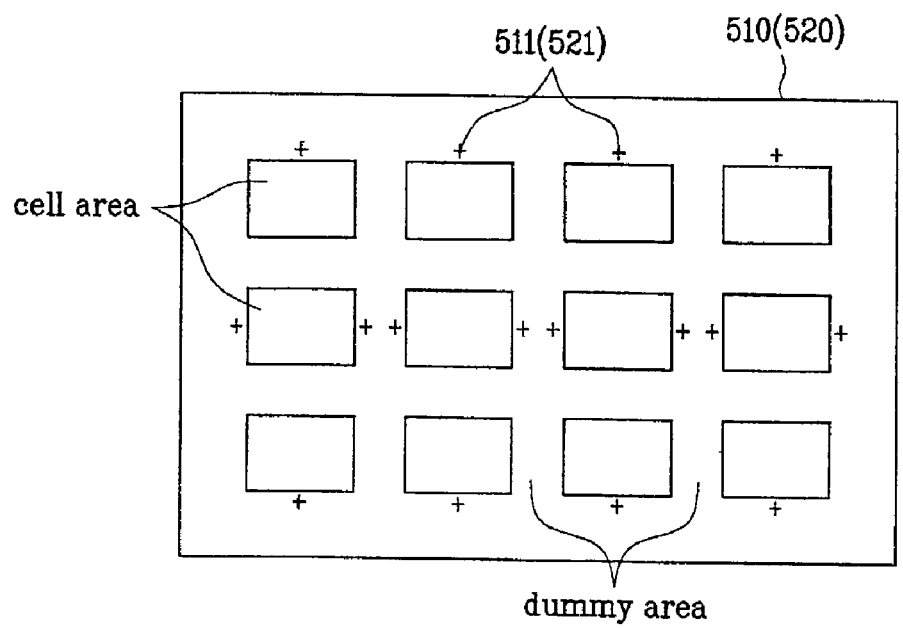
FIG. 3D is a plane view of another exemplary substrate for fabricating a liquid crystal display according to the present invention.

FIG. 3D is a plane view of another exemplary substrate for fabricating a liquid crystal display according to the present invention. In FIG. 3D, each of the alignment marks 511 and 521 may be formed in the dummy area on each central portion of the circumference of each column.

Figure 3E:
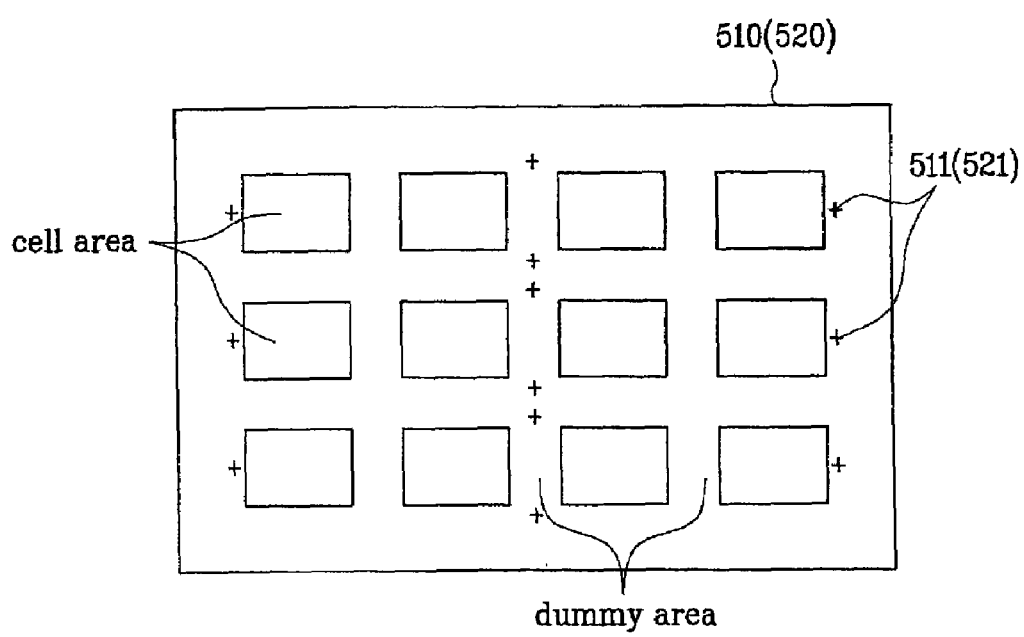
FIG. 3E is a plane view of another exemplary substrate for fabricating a liquid crystal display according to the present invention.

FIG. 3E is a plane view of another exemplary substrate for fabricating a liquid crystal display according to the present invention. In FIG. 3E, each of the alignment marks 511 and 521 may be formed in the dummy area on each central portion of the circumference of each row.

Furthermore, though not shown in the drawing, more alignment marks other than those mentioned above may be additionally formed either on the two diagonal corner regions of each substrate 510 and 520 or on all four diagonal corner regions thereof. Moreover, the first and second substrates 510 and 520 may be formed so that the position alignment of the each substrate is carried out not only at two or four corner regions of each of the first and second substrates 510 and 520, but also at each cell area wherein each liquid crystal display is formed.

Figure 4:
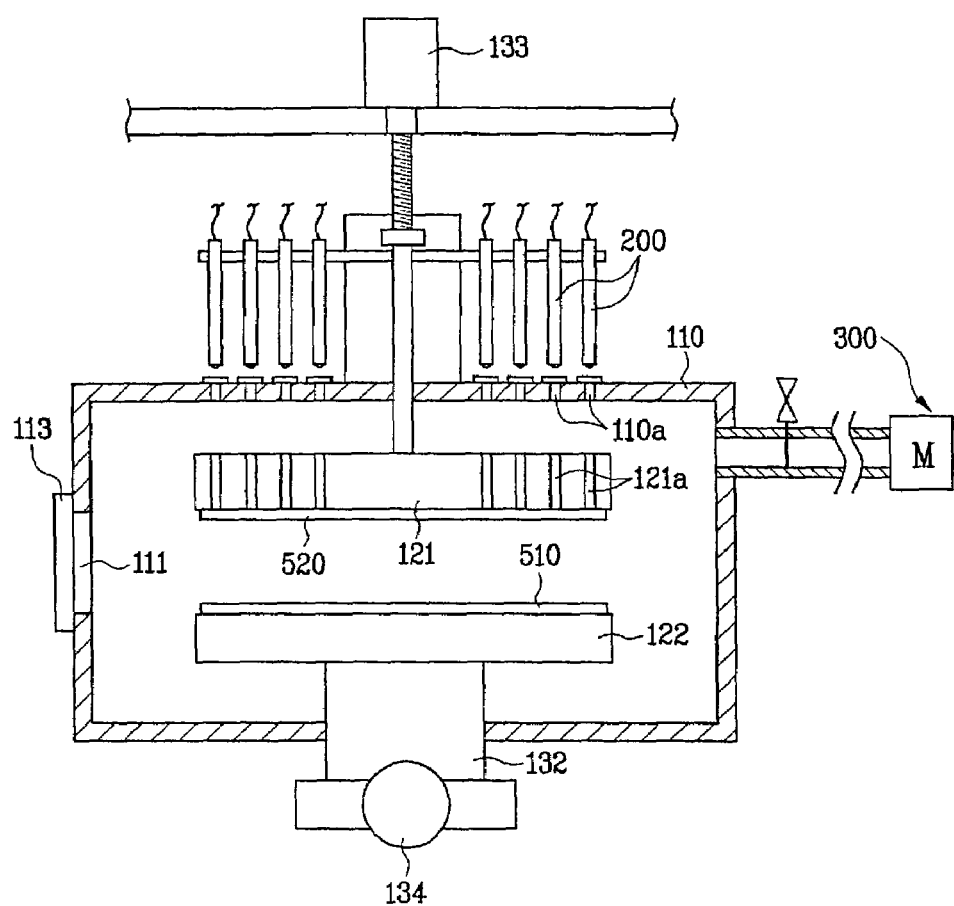
FIG. 4 is a cross sectional view of an exemplary bonding device for fabricating a liquid crystal display according to the present invention.

FIG. 4 is a cross sectional view of an exemplary bonding device for fabricating a liquid crystal display according to the present invention. In FIG. 4, the bonding device may include a vacuum chamber 110, an upper stage 121, a lower stage 122, and a plurality of alignment cameras 200 functioning as a part of an alignment system positioned along an upper portion of the vacuum chamber 110. Alternatively, the vacuum chamber 110 may include upper and lower portions that may be movable or stationary in order to facilitate loading/unloading of substrates. The upper stage 121 may include a plurality of first observation holes 121a formed through the upper stage 121 in alignment with a plurality of second observation holes 110a formed through an upper portion of the vacuum chamber 110. The first observation holes include at least two perimeter holes located at an outer perimeter of the upper stage, with the two perimeter holes in opposite edge regions of the upper stage. The first observation holes further include at least one inner hole between the two perimeter holes, as illustrated in FIG. 4. Thus, each of the alignment cameras 200 may be aligned to each of the first and second observation holes 121a and 110a to verify alignment of the first and second substrates 510 and 520 via the first and second alignment marks 511 and 521 (not shown).

Alternatively, the alignment cameras 200 may be positioned along a lower portion of the vacuum chamber 110. Accordingly, a plurality of first and second observation holes corresponding to the lower stage 122 may be similarly formed.

A total number of the alignment cameras 200 may correspond to a total number of the first and second alignment mark 511 and 521 of the first and second substrates 510 and 520. However, the total number of alignment cameras 200 may not necessarily be equal to the total number of the first and second alignment marks 511 and 521 of the first and second substrates 510 and 520. Moreover, each of the alignment cameras 200 may be movably fixed on the upper portion of the vacuum chamber 110, so that the alignment cameras 200 move to a location whereby each second observation hole 110a is formed during the alignment process of each of the first and second substrates 510 and 520. Accordingly, a process of verifying locations of the cell areas, each of which is formed at a locations corresponding to each of the first and second substrates 510 and 520, may be carried out.

Figure 5:
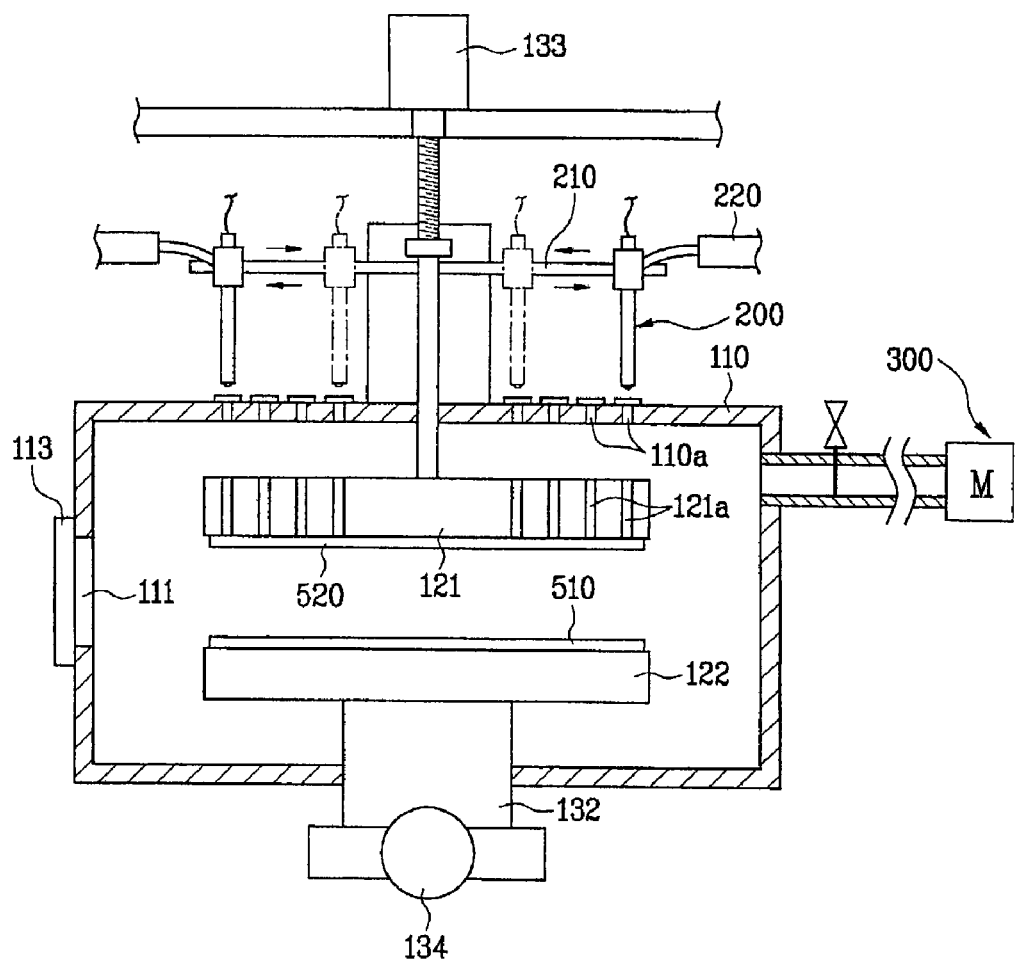
FIG. 5 is a cross sectional view of another exemplary bonding device for fabricating a liquid crystal display according to the present invention.

FIG. 5 is a cross sectional view of another exemplary bonding device for fabricating a liquid crystal display according to the present invention. In FIG. 5, an end of each of the alignment cameras 200 may be mounted on a support rail 210 that is positioned at a location corresponding to each of the first and second alignment marks 511 and 521, whereby each second observation hole 110a may be formed on each upper corner region of the vacuum chamber 110 and the first and second alignment marks 511 and 521 may be positioned within a pre-determined range along the support rail 210. Accordingly, each of the alignment cameras 200 may travel along the support rail to sequentially verify alignment of the first and second substrates 510 and 520, thereby reducing the total number of alignment cameras 200. In addition, each of the alignment cameras 200 may be movably formed by using a driving system 220, such as a pneumatic hydraulic cylinder or a step motor to travel along the support rail 210.

Meanwhile, the upper and lower stages 121 and 122 may be movably positioned to perform position alignment and bonding processes of the first and second substrates 510 and 520. The upper stage 121 may be moved along a vertical direction, a rotational axis 132 may selectively rotate the lower stage 122 in a clockwise or counterclockwise direction, and driving motors 133 and 134 may move the upper and lower stages 121 and 122, respectively, along the vertical direction. In addition, a separate rotational axis (not shown) may be formed on the upper stage 121 to allow rotational movement, and a separate moving axis (not shown) may be formed on the lower stage 122 to allow movement along the vertical direction.

Figure 6:
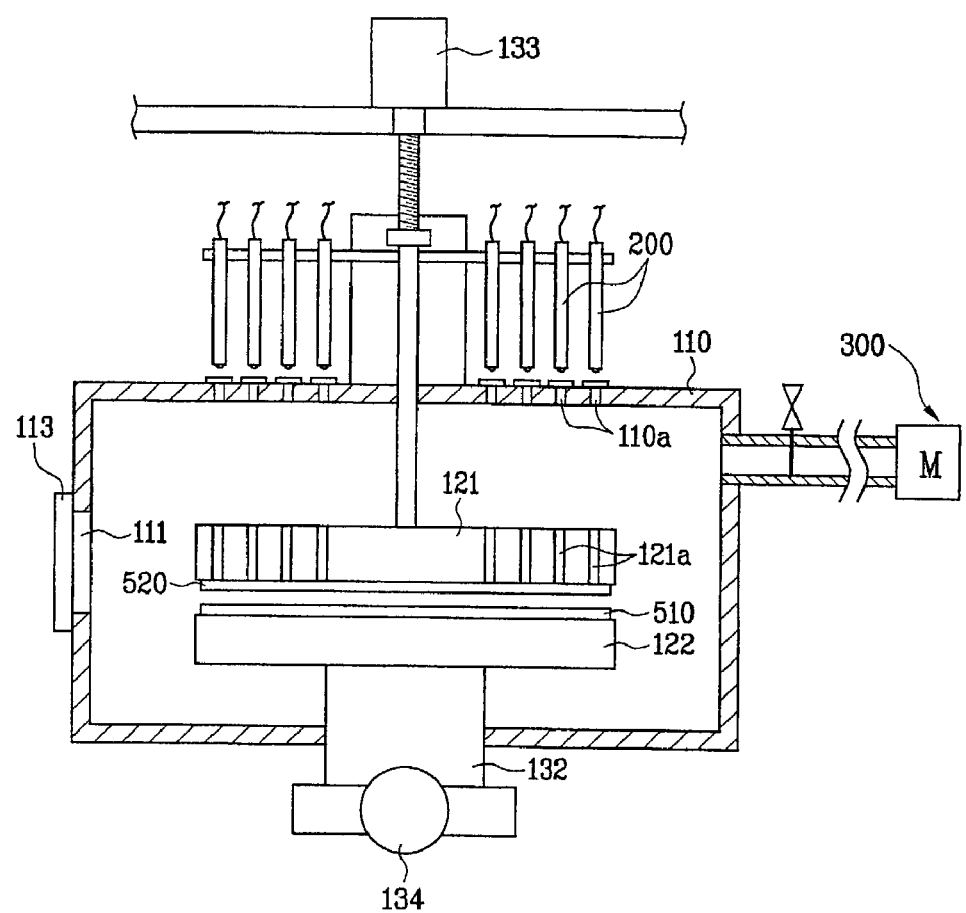
FIG. 6 is a cross sectional view of the exemplary bonding device during a substrate bonding process according to the present invention.
Figure 7:
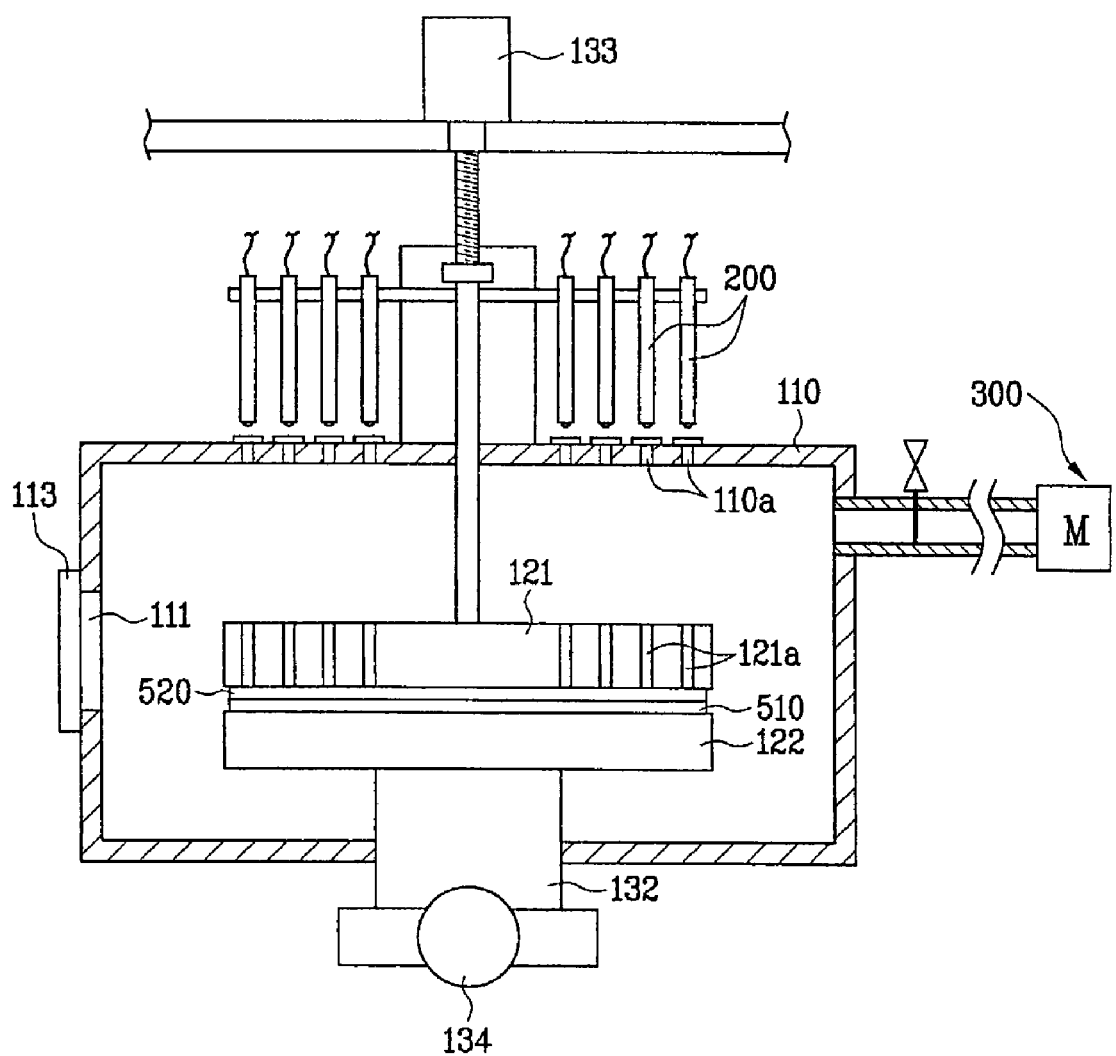
FIG. 7 is a cross sectional view of the exemplary bonding device during a substrate bonding process according to the present invention.

FIGS. 6 and 7 are cross sectional views of the exemplary bonding device during a substrate bonding process according to the present invention. In FIG. 6, each of the first and second substrates 510 and 520 are loaded onto the upper and lower stages 121 and 122, respectively. Then, a blockage door 113 is positioned into an in-flow opening 111 and the in-flow opening 111 is closed, thereby sealing the interior of the vacuum chamber 110. Next, the vacuum system 300 removes air from the interior of the sealed vacuum chamber 110, thereby reducing the pressure of the vacuum chamber 110. Once a desired pressure is obtained, the vacuum system 300 is stopped, and the first and second substrates 510 and 520 are each affixed to the upper stage 121 and the lower stage 122, respectively.

Subsequently, the first driving motor 133 may be enabled to move the upper stage 121 along the vertical direction to an alignment position, thereby placing a lowermost surface of the second substrate 520 above an uppermost surface of the first substrate 510. While the upper stage 121 is in the alignment position, each of the alignment cameras 200 may be enabled to verify the relative positions of each of the first and second substrates 510 and 520 through each of the first and second observation holes 121a and 110a. Accordingly, each of the alignment cameras 200 may be enabled to observe and verify positions of each of the first and second alignment marks 511 and 521 of each of the first and second substrates 510 and 520, respectively.

After verifying positions of each of the first and second alignment marks 511 and 521, movement of the upper and lower stages 121 and 122 may be controlled. Accordingly, the upper stage 121 and/or the lower stage 122 may be moved along a first direction X and/or a second direction Y order to compensate for misalignment of the first and second alignment marks 511 and 521. Even though the position alignment among a plurality of cell areas is carried out with accuracy, a misalignment may occur in a specific cell area. In this case, the upper and lower stages 121 and 122 may be moved within an acceptable error range, which is based on the position alignment between the first and second substrates 511 and 521. However, when position alignment among a plurality of cell areas, or a single cell area may not be fully obtained within the acceptable error range, then coordinates of the specific cell area(s) may be saved as a data file, which may then be sent to a later process, thereby notifying an operator that a possible bonding deficiency may have occurred or may about to occur.

FIG. 7 is a cross sectional view of the exemplary bonding device during a substrate bonding process according to the present invention. In FIG. 7, after the position alignment of the first and second substrates 510 and 520 is completed, the driving motor 133 that moves the upper stage 121 may receive driving signals to move the upper stage 121 to a bonding position. Then, pressure is applied to the second substrate 520 mounted to the upper stage 121 and the first substrate 510 mounted to the lower stage 122, thereby bonding the first and second substrates 510 and 520 together, as shown in FIG. 7.

It will be apparent to those skilled in the art that various modifications and variations can be made in the bonding device and substrate for fabricating a liquid crystal display of the present invention without departing from the spirit or scope of the invention. Thus, it is intended that the present invention cover the modifications and variations of this invention provided they come within the scope of the appended claims and their equivalents.

What is claimed is:

1. A bonding device for fabricating a liquid crystal display, comprising:
   a vacuum chamber;
   an upper stage and a lower stage within the vacuum chamber, the upper and lower stages for respectively attaching first and second substrates;
   a stage moving system moving at least one of the upper and lower stages;
   a plurality of first observation holes formed through regions of the upper stage, wherein the first observation holes include at least two perimeter holes located at an outer perimeter of the upper stage and at least one inner hole located inside the outer perimeter of the upper stage;
   a plurality of second observation holes formed through an upper portion of the vacuum chamber, each aligned to one of the plurality of first observation holes; and
   a plurality of alignment cameras, each camera aligned with the each of the first and second observation holes.

2. The device according to claim 1, wherein each of the alignment cameras moves along a support rail to be aligned with more than one of the first and second observation holes.

3. The device according to claim 1, further comprising:
   a first driving system for moving the upper stage; and
   a second driving system for moving the alignment cameras independently from the first driving system.

4. The device according to claim 1, wherein a number of the plurality of alignment cameras is more than four.

5. The device according to claim 1, wherein each of the first and second substrates has a plurality of cell areas, dummy area and alignment marks formed in the dummy area at corner regions of the cell areas.

6. The device according to claim 5, wherein each of the first and second observation holes are aligned with one of the alignment marks.

7. The device according to claim 5, wherein at least one of the first observation holes is aligned with a portion of the dummy area centered between two adjacent cell areas.

8. The device according to claim 7, wherein the first and second observation holes are aligned with one of the alignment marks.

9. The device according to claim 5, wherein each of the alignment cameras observes each of the alignment marks within a range of an area.

10. The device according to claim 5, wherein each of the alignment cameras observes at least one of the plurality of alignment marks formed on the first and second substrates.

11. The device according to claim 5, wherein each of the alignment cameras observes a central region between each of the plurality of alignment marks formed on the first and second substrates.

12. The device according to claim 5, wherein a first plurality of alignment cameras observe a first plurality of the alignment marks at first portions of first and second substrates, and a second plurality of alignment cameras observe a second plurality of the alignment marks at second portions of the first and second substrates, the first alignment marks being different from the second alignment marks.

* * * * *